March 12, 1940.  H. ANDERSON  2,193,385
ADJUSTER FOR HYDRAULIC BRAKES
Filed Jan. 16, 1939   2 Sheets-Sheet 1

Henry Anderson
INVENTOR.
BY C.A. Snow & Co.
ATTORNEYS.

March 12, 1940.   H. ANDERSON   2,193,385
ADJUSTER FOR HYDRAULIC BRAKES
Filed Jan. 16, 1939   2 Sheets-Sheet 2
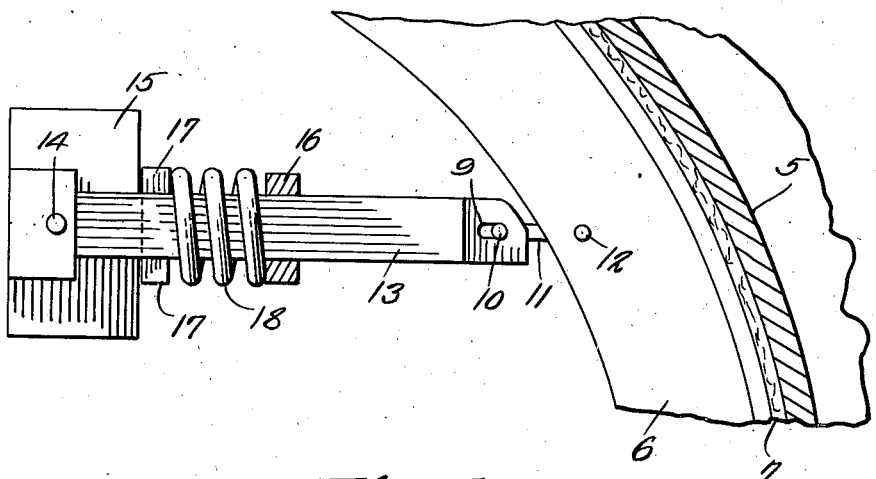
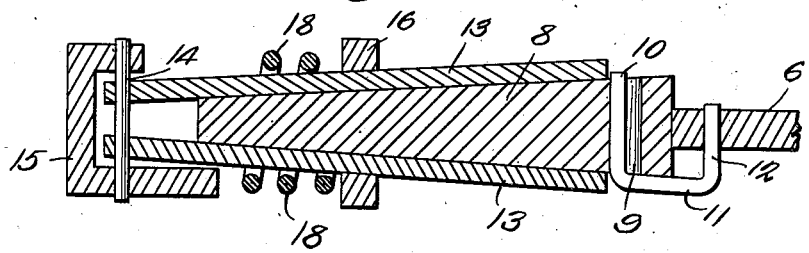
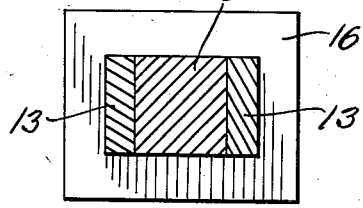
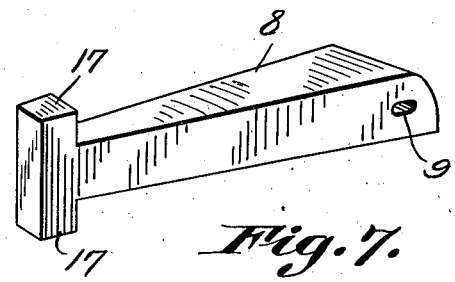
Henry Anderson
INVENTOR.
BY *CASnowLeo*
ATTORNEYS.

Patented Mar. 12, 1940

2,193,385

UNITED STATES PATENT OFFICE 2,193,385

ADJUSTER FOR HYDRAULIC BRAKES

Henry Anderson, Swissvale, Pa.

Application January 16, 1939, Serial No. 251,222

3 Claims. (Cl. 188—79.5)

This invention relates to motor vehicle brake construction, the primary object of the invention being to provide means for automatically adjusting the brake shoes of a vehicle brake, compensating for wear on the brake lining, and insuring the true operation of the brakes at all times.

An important object of the invention is to provide an adjusting device which will maintain the brake shoes in proper spaced relation with the brake drums with which they are used regardless of the wear on the brake lining of the shoes.

Another important object of the invention is to provide a device of this character which may be readily applied to the usual brake shoes, eliminating the necessity of making alterations in the brake structure to mount the device.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 4 is an elevational view indicating the position of a brake shoe with respect to the adjusting device, when the brake shoe has been moved into engagement with the brake drum associated therewith.

Figure 5 is a sectional view taken on line 5—5 of Figure 2.

Figure 6 is a sectional view taken on line 6—6 of Figure 2.

Figure 7 is a perspective view of one of the wedge bars, forming a part of the adjusting device.

Figure 1:
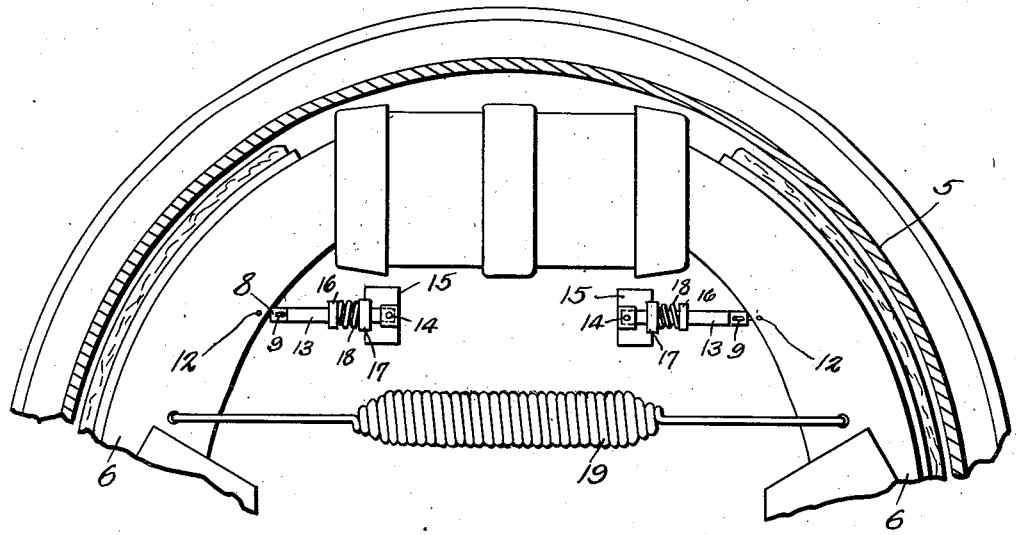
Figure 1 is a fragmental sectional view through a brake drum, illustrating the adjusting device as mounted on the brake shoes.
Figure 2:
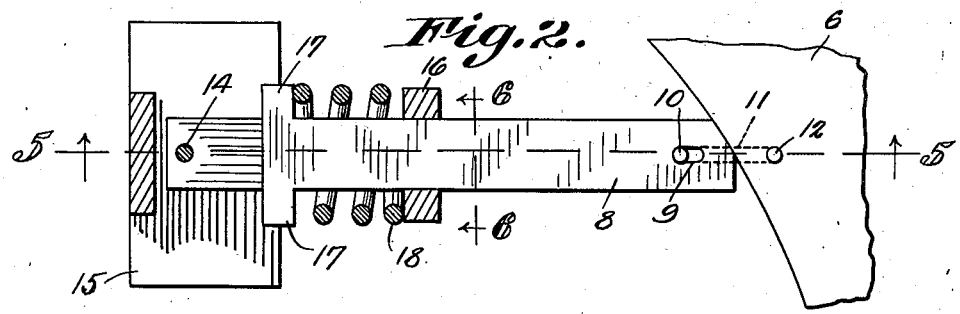
Figure 2 is an enlarged elevational view illustrating an adjusting device as connected with a brake shoe.
Figure 3:
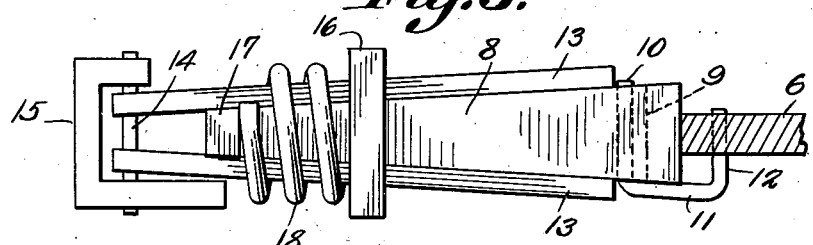
Figure 3 is a plan view thereof.

Referring to the drawings in detail, the reference character 5 designates a brake drum with which the adjusting device is used. Operating within the brake drum, is the usual brake shoe indicated at 6, which is supplied with the usual lining 7 that contacts with the brake drum in restricting rotary movement of the brake drum and wheel supporting the brake drum. As shown by Figure 1 of the drawings, the lining 7 is normally spaced a predetermined distance from the brake drum, and is moved into engagement with the brake drum, by the usual brake shoe operating mechanism not shown.

The brake shoe adjusting device embodies a wedge bar 8, which is formed with an elongated opening 9 disposed adjacent to one end thereof, the opening being designed to receive the right angled end 10 of the pin 11, which has its end 12, extended through an opening in the flange of the brake shoe 6, with which it is used. Thus it will be seen that due to this construction, a slight movement of the wedge bar 8 with respect to the brake shoe, is permitted.

Cooperating with the wedge bar 8, are bars 13, which are disposed on opposite sides of the wedge bar, the bars 13 being formed with aligning openings for the reception of the pin 14, which extends through the bracket 15, which in turn is secured to the flange plate of the brake structure. Slidably mounted over the bars 13, is the yoke 16, which holds the bars 13 into close engagement with the wedge bar 8, at all times.

As clearly shown by Figure 7 of the drawings, lugs 17 extend from the wedge bar 8, and provide a stop against which one end of the coiled spring 18 engages, the opposite end of the coiled spring resting against the yoke 16 to urge the yoke towards the wide end of the wedge bar 8.

In view of the fact that both adjusting devices shown in Figure 1 of the drawings, are identical, only one of the adjusting devices has been described in detail.

The brake shoes 6 are actuated in the usual and well known manner, and are returned to their normal inactive positions, by means of the coiled spring 19 that has its ends fitted in openings of the brake shoes 6. The action of spring 19 is to urge the shoes towards each other when the brake operating mechanism has been released.

From the foregoing it will be seen that brake shoes equipped with an adjusting device constructed in accordance with the invention, may move the distance between the right angled end 10 of the pin 11, and outer edge of the elongated opening, to apply the brakes. When the brake lining becomes worn and it is necessary for the brake shoes to move a greater distance, in order to contact with the brake drum, the right angled end 10 will engage the outer wall of the elongated opening in which it is positioned, moving the wedge bar outwardly, automatically adjusting the wedge bar to compensate for the wear of the brake band. When the wedge bar moves outwardly, the yoke 16 is automatically forced outwardly, under the action of the spring 18, securing the wedge member against inward movement with respect to the bars 13, when the coiled spring 19 returns the brake shoes to their inactive positions. Thus it will be seen that the normal inactive positions of the brake shoes are advanced towards the brake drum, compensating for wear of the brake lining, and insuring a true operation of the brake shoes and brake shoe operating mechanism, at all times.

What is claimed is:

1. In a brake having a brake housing, a brake drum and brake shoes, a brake shoe adjusting means comprising stationary brackets mounted within the housing, pairs of bars pivotally connected to the brackets and converging towards the brackets, a wedge-shaped bar slidably mounted between each pair of bars, a yoke surrounding each pair of bars and wedge-shaped bar associated therewith, yieldable means normally urging said yokes outwardly restricting inward movement of said wedge-shaped bars, and connecting means between the wedge-shaped members and brake shoes whereby movement of the wedge-shaped members adjusts said brake shoes.

2. In a brake having a brake housing, a brake drum and brake shoes, a brake shoe adjusting means comprising stationary brackets mounted within the housing, pairs of bars pivotally connected to the brackets and converging towards the brackets, said bars being mounted for movement towards and away from each other, a wedge-shaped bar slidably mounted between each pair of bars, a yoke surrounding each pair of bars and wedge-shaped bar associated therewith, yieldable means normally urging said yokes outwardly restricting inward movement of said wedge-shaped bars, links slidably connected with the wedge-shaped bars and having connection with the brake shoes, and said wedge-shaped bars adapted to move between the pairs of bars adjusting the brake shoes with respect to the brake drum.

3. In a brake having a brake housing, a brake drum and brake shoes, a brake shoe adjusting means comprising stationary brackets mounted within the housing, pairs of bars pivotally connected to the brackets and converging towards the brackets, said bars being mounted for movement towards and away from each other, a wedge-shaped bar slidably mounted between each pair of bars, a yoke surrounding each pair of bars and wedge-shaped bar associated therewith, a coiled spring surrounding portions of the bars and bearing against said yokes, normally urging the yokes outwardly restricting inward movement of said wedge-shaped bars, and link members connected with said shoes and having slidable connection with said wedge-shaped bars, whereby movement of the wedge-shaped members operates to adjust said brake shoes with respect to the brake drum.

HENRY ANDERSON.